United States Patent
Otoguro

Patent Number: 5,975,018
Date of Patent: Nov. 2, 1999

[54] DISCHARGED URINE OR OTHER WASTE FLUIDS PROCESSING MATERIAL FOR PET ANIMALS

[75] Inventor: Masaaki Otoguro, Yaizu, Japan

[73] Assignee: Peparlet Co., Ltd., Shizuoka-ken, Japan

[21] Appl. No.: 09/018,916

[22] Filed: Feb. 5, 1998

[51] Int. Cl.$^6$ .................................................. A01K 1/015
[52] U.S. Cl. ............................................ 119/171; 119/172
[58] Field of Search ................................ 119/171, 169, 119/172, 173; 426/621, 623, 808; 252/184

[56] References Cited

U.S. PATENT DOCUMENTS

| | | |
|---|---|---|
| 2,190,949 | 2/1940 | Plews ................................ 99/82 |
| 3,284,273 | 11/1966 | Prentice . | |
| 4,506,628 | 3/1985 | Stockel . | |
| 4,813,996 | 3/1989 | Gardner et al. . | |
| 4,889,733 | 12/1989 | Willard et al. ....................... 426/438 |
| 5,100,600 | 3/1992 | Keller et al. ........................ 119/171 X |
| 5,176,936 | 1/1993 | Creighton et al. ..................... 226/618 |
| 5,566,642 | 10/1996 | Ochi ................................ 119/171 |
| 5,579,722 | 12/1996 | Yamamoto et al. .................... 119/169 |
| 5,664,523 | 9/1997 | Ochi et al. .......................... 119/173 |
| 5,743,213 | 4/1998 | Fujiura ............................. 119/172 |

*Primary Examiner*—Robert P. Swiatek
*Assistant Examiner*—Yvonne R. Abbott
*Attorney, Agent, or Firm*—Wenderoth, Lind & Ponack, L.L.P.

[57] ABSTRACT

A discharged urine or other waste fluids processing material for pet animals composed of fluid absorbent coarse particles which are subjected to compression molding without the addition of water so as to have a prescribed pellet configuration.

31 Claims, 4 Drawing Sheets

DISCHARGED URINE OR OTHER WASTE FLUIDS PROCESSING MATERIAL FOR PET ANIMALS

BACKGROUND OF THE INVENTION

This invention relates to a discharged urine or other waste fluids processing material for pet animals, composed of fluid absorbent coarse particles. More particularly, this invention relates to a processing material, composed of fluid absorbent coarse particles (particulate matter), which is used for processing discharged urine or other waste fluids of pet animals such as cats, household dogs, and the like.

The waste fluids processing material composed of the fluid absorbent coarse particles is laid flat in a tray so as to be used for processing the discharged urine or other waste fluids of cats and dogs. A feature of such waste fluids processing material for pet animals is that only the portion of the pellets of coarse particles which have absorbed the urine or the like is removed, and the removed portion is replenished with fresh coarse particles.

In order to take advantage of this feature, it is important that the coarse particles that absorb fluid are limited to the area of discharged urine or other waste fluids. Furthermore, the urine should be prevented from dispersing to an area other than the area used for discharging urine or other waste fluids, and be prevented from permeating into the coarse particles in an area other than the area in which urine or other waste fluids were discharged.

However, the conventional comparative materials are usually obtained by compressing a wet starting material (starting material with water added) by using a perforated plate, a mesh, or an extruder having tiny through-holes.

The waste fluids processing material formed by this method tends to have an irregular configuration of particles because the material is naturally torn off at the outlet ports of the tiny through-holes. Therefore, the urine waste fluids processing material is coarse in density at the torn-off portion and has low composition density (large number of voids). These voids are further enlarged by drying, thus generating a honey comb-shaped cavity and cracking.

Such particles are readily crumbled and deteriorate when they retain fluid. As a result, the area in which the urine or other waste fluids were discharged is dispersed and the coarse particles fluid absorption area is enlarged.

SUMMARY OF THE INVENTION

It is, therefore, a general object of the present invention to provide a material for processing discharged urine or other waste fluids of pet animals which is capable of obviating the problems inherent in the prior art.

According to the waste fluids processing material of the present invention, a starting material blended with various additives is compression molded by a closed mold without adding water. This forms pellets of fluid absorbent particles, each of which have a prescribed pellet configuration.

The pellets of fluid absorbent particles thus obtained rapidly absorb discharged urine or other waste fluids and are excellent in disaggregation when they are discarded in a toilet. Furthermore, by providing a prescribed configuration, the quantity of the processing material to be laid in a unit area can be fixed, so that wasteful use of the material can be prevented. In addition, the fluid absorbability of the processing material at the area where the material is laid can be made uniform. Furthermore, cracking caused by torn off ends and drying can be prevented from occurring. As a result, crumbling of the pellets of particles can be prevented, and dispersion and excessive permeation of waste fluid into the pellets in an area adjacent to the area in which urine or other waste fluids were discharged can be prevented.

Since the starting material is compression molded without adding water into a compact product, the particles can be freely blended with a fluid reacted matter and a temperature deteriorated matter as represented by a moisture absorptive polymer, so that the function is enhanced. In addition, the factory space can be efficiently used by eliminating the need for drying facilities and water processing facilities in the compacting.

As means for preventing dispersion and excessive permeation of waste fluids into the pellets in an area adjacent to the area of discharged waste fluids, the pellets of fluid absorbent coarse particulate matter are compacted by compression molding so that each pellet has a prescribed configuration. Moreover, the pellets are each formed so as to have a circular, tubular or a polygonal, tubular peripheral surface. Also one or both of an upper surface and a lower surface of each of the pellets are formed to exhibit a convex or concave curved configuration.

The pellets of the fluid absorbent coarse particulate matter point-contact each other at their circular configuration areas, or side-contact each other at their polygonal configuration areas. Consequently, they are as intimately contacted with each other as possible, and so can be laid uniformly. In addition, by arranging the pellets so that the convex configuration portions contact the surface of a tray to form an annular void around the top of the convex configuration, the discharged urine, etc. can be retained and more smoothly absorbed under the effect of capillary action generated in the annular void. This phenomenon in the individual pellets can efficiently prevent dispersion and excessive permeation of urine, etc. into the pellets in an area other than the area of discharged urine or other waste fluids.

Similarly, by arranging the pellets of fluid absorbent coarse particles so that the concave configuration portions face upwardly, the fluids can be retained by a urine receiving dish defined by the respective concave configuration portions. In that way, the smooth absorption of urine, etc. is enhanced, and the dispersion and permeation area of waste fluid can be prevented from becoming enlarged while the material efficiently retains the waste fluids.

The particles may be blended with a fluid absorptive polymer when compacted. This fluid absorptive polymer is weakly reacted on the surface of each pellet of particulate matter so that a weak reaction layer (cover-coat) of the fluid absorptive polymer is formed on the surface.

The blending (inner lining) of the fluid absorptive polymer and the formation of the weak reaction layer are useful in compression molding without adding water. In doing so, the pellets of particles exhibit the advantageous effect of the fluid absorptive polymer, which is readily gelled and coagulated by absorbing the discharged waste fluids. Furthermore, because of the formation of the weak reaction layer by the fluid absorptive polymer, the pellets of particles can retain their configuration without degrading their fluid absorbability, and the contained fluid absorptive polymer can be protected from moisture in a favorable manner.

The above-mentioned cover-coat can be formed from polyvinyl alcohol starch powder, or the like.

DETAILED DESCRIPTION OF THE PREFERRED EMBODIMENTS

Figure 1A:
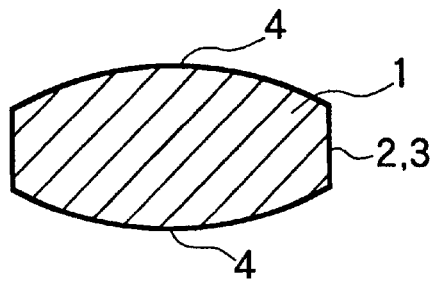
FIGS. 1(A)–1(B) are sectional views of a discharged urine or other waste fluids processing material for pet animals composed of pellets of fluid absorbent coarse matter, one or both of the upper and lower surfaces of which exhibit a convex configuration.

Several embodiments of the present invention will be described hereinafter in detail with reference to FIGS. 1 through 7 of the accompanying drawings. In those embodiments, the present invention is directed to a case where a discharged urine or other waste fluids processing material for pet animals is composed of a fluid absorbent coarse particles (particulate matter) 1.

In the respective embodiments to be described hereinafter, the fluid absorbent coarse particulate matter 1 is chiefly composed of a starting material (hereinafter simply referred to as the "absorptive material") which is capable of providing a fluid absorbability when compacted. The absorptive material providing a fluid absorbability when compacted may include, for example, a wide variety of pulps (virgin pulp, old paper pulp, pulp residue passed through a paper-making mesh in the paper-making process, or paper-making sludge whose content of inorganic filler such as calcium carbonate is appropriately adjusted), paper powder, sawdust, wood powder, bean-curd refuse, rice hulls, coffee bean hulls, coffee been residue, tea hulls, activated carbon, and the like. It may also contain pulverized organic matter such as plastic, rubber, or the like.

In addition, the absorptive material, namely, the fluid absorbent coarse particles 1, may be blended with additives so that a required additional function can be produced. For example, an additive chiefly for providing weight to the particulate matter (a weight additive) may be at least one kind of pulverized inorganic filler selected from the group consisting of calcium carbonate, talc, silica gel, clay, zeolite, bentonite, lime, kaolin, borite, anhydrous mirabilite, sodium chloride, and the like. In particular, anhydrous mirabilite and sodium chloride are suitable as a weight additive, and also effective as a waste fluids processing material which is required to be readily dissolved in water and easily discarded into a toilet. They are also suited for an application where the processing material is compression molded with no water added.

As an additive for chiefly applying a coagulation ability to the area contacting the waste fluid, at least one kind of pulverized matter such as starch, carboxyl methyl cellulose, or a fluid absorptive polymer is selectively blended. The fluid absorptive polymer is a suitable material because it is capable of enriching absorption ability and has high coagulation reactibility. Furthermore, the coagulating material or the inorganic filler can provide sliding ability, enhance smooth compression molding, and provide favorable removability after molding.

An antibacterial material or anti-mildew agent is used as an inside lining material or a surface layer material of the fluid absorbent coarse particulate matter 1. In the alternative, a surface active agent is used as an inside lining material or a surface layer material of the fluid absorbent coarse particulate matter 1. A deodorant is used as an inside lining material or a surface layer material against urine or the like.

[First Embodiment (see FIGS. 1 through 5)]

The absorptive material (including those blended with the various kinds of additives mentioned above) is compression molded without adding water so that it is compacted to have a prescribed pellet configuration, thereby forming pellets of the fluid absorbent coarse particulate matter 1. Since the pellets each have a prescribed configuration, the absorptive material is compression molded with its overall peripheral surface confined by a closed mold as shown in FIGS. 6 and 7. As a specific example, pulp is blended with an inorganic filler material, and further blended with a fluid absorptive polymer. The result is compression molded without adding water to form the pellets of fluid absorbent coarse particulate matter 1 having a prescribed pellet configuration.

Figure 1B:
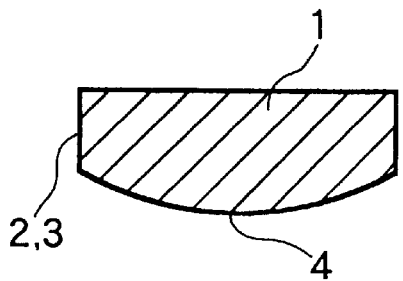

As shown in FIGS. 1 and 3, a circular, tubular configuration 2 or a polygonal, tubular configuration 3 (for example, hexagonal or octagonal) is formed on the peripheral surface of the pellets of fluid absorbent coarse particulate matter 1. A convex configuration 4 is formed on one or both of the upper and the lower surface thereof by compression molding without adding water.

Figure 2A:
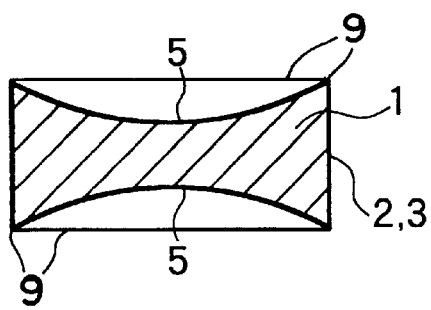
FIGS. 2(A)–2(B) are sectional views of a discharged urine or other waste fluids processing material for pet animals composed of pellets of fluid absorbent coarse matter, one or both of the upper and lower surfaces of which exhibit a concave configuration.
Figure 2B:
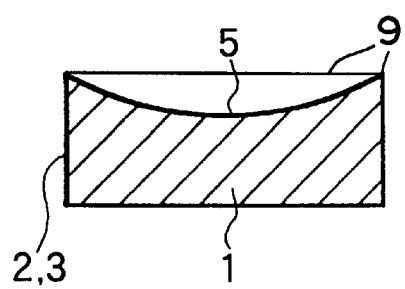

Also, as shown in FIGS. 2 and 3, a circular configuration 2 or a polygonal configuration 3 (for example, hexagonal or octagonal) is formed on the peripheral surface of the pellets of fluid absorbent coarse particulate matter 1. A concave configuration 5 is formed on one or both of the upper and the lower surface thereof by compression molding without added water.

Also, a flat configuration may be formed on one or both of the upper and lower surfaces of the pellets of fluid absorbent coarse particulate matter 1 by compression molding without adding water.

Pellets of the fluid absorbent coarse particles 1 thus obtained by compression molding exhibit such excellent features that waste fluid is rapidly absorbed, and the disaggregation is excellent when the matter 1 is discarded into a toilet.

By providing a prescribed pellet configuration, the pellets of particulate matter 1 can be laid uniformly. Furthermore, the fluid absorbability at the surface where the pellets of fluid absorbent course particulate matter 1 is laid is equalized.

In addition, the convex configuration 4 and the concave configuration 5 of the upper and lower surfaces of the pellets of fluid absorbent coarse particulate matter 1 enhance the ability to capture waste fluid, as shown in FIGS. 4 and 5. This ability to capture waste fluid will be described in detail in the second embodiment.

[Second Embodiment (see FIGS. 1 through 5)]

The technical concept of the second embodiment resides in the feature that the absorbent material is compression molded with the addition of water so that it is compacted to have a prescribed pellet configuration. This thereby provides the convex configuration 4 or the convex configuration 5. Accordingly, the Figures showing the outer configuration of the material are common for the first and second embodiments.

Specifically, the absorptive material (including that blended with the various kinds of additives mentioned above) is compression molded with the addition of water so that it is compacted to have a prescribed pellet configuration and dried, thereby forming the pellets of fluid absorbent coarse matter 1. Since the pellets each have a prescribed configuration, the absorptive material is compression molded with its overall peripheral surface confined by a closed mold as shown in FIGS. 6 and 7.

As shown in FIGS. 1 and 3, a circular configuration 2 or a polygonal configuration 3 (for example, hexagonal or octagonal) is formed on the peripheral surface of the fluid absorbent coarse particulate matter 1. Also, a convex configuration 4 is formed on one or both of the upper and the lower surface thereof by compression molding with the addition of water.

Also, as shown in FIGS. 2 and 3, a circular configuration 2 or a polygonal configuration 3 (for example, hexagonal or octagonal) is formed on the peripheral surface of the pellets of fluid absorbent coarse particulate matter 1. Also, a concave configuration 5 is formed on one or both of the upper and the lower surface thereof by compression molding with the addition of water.

Figure 4A:
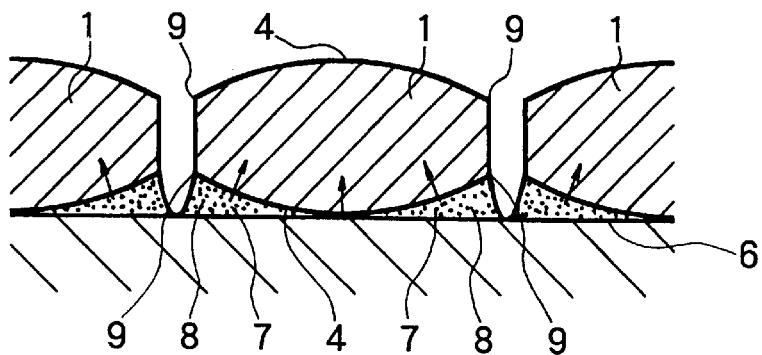
FIGS. 4(A)–4(B) are sectional views of the pellets of fluid absorbent coarse matter having a convex surface, as shown in FIGS. 1(A)–1(B), for explaining the effect of retention of urine and other waste fluids, in case such fluid absorbent coarse matters are laid.
Figure 4B:
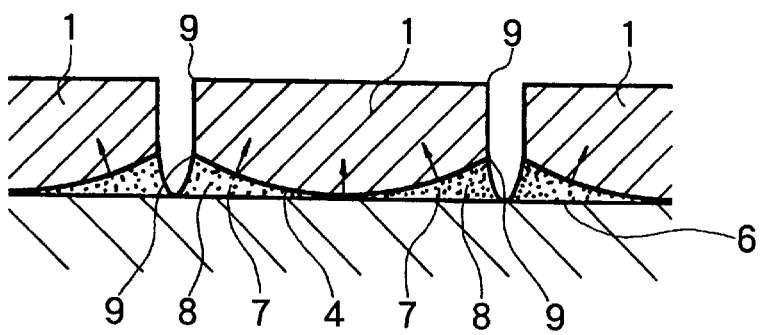

By providing a prescribed pellet configuration, the pellets can be laid uniformly and the fluid absorbability at the surface where the pellets of fluid absorbent coarse particulate matter 1 is laid is equalized. In addition, the convex configuration 4 and the concave configuration 5 of the upper and lower surfaces of the pellets of fluid absorbent coarse particulate matter 1 enhance the waste fluid capturing function, as shown in FIGS. 4 and 5. 5 As shown in FIGS. 4(A)–(B), when the pellets are arranged so that the surface having the convex configuration 4 contacts a laying surface 6 of a tray, or the like, forming an animal commode, an annular void 7 is formed around the apex of the convex configuration 4. This annular void 7 retains urine or waste fluid 8 by capillary action, and serves to absorb fluid by each fluid absorbent coarse particulate matter 1.

Figure 5A:
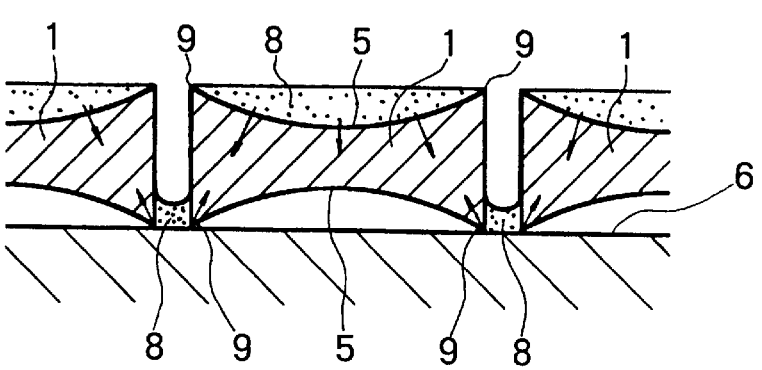
FIGS. 5(A)–5(B) are sectional views of the pellets of fluid absorbent coarse matter having a concave surface, as shown in FIGS. 2(A)–2(B), for explaining the effect of retention of urine and other waste fluids, in case such fluid absorbent coarse matters are laid.
Figure 5B:
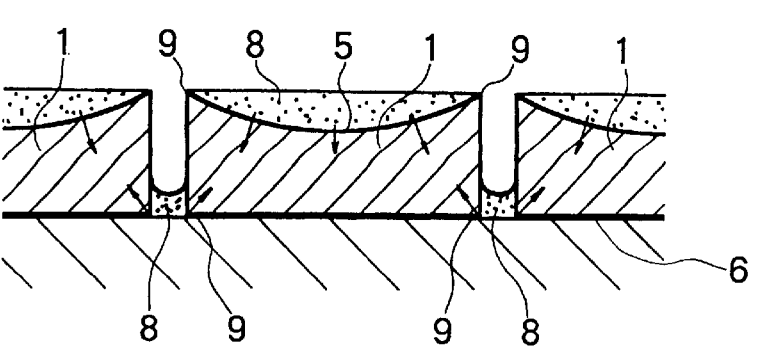

As shown in FIGS. 5(A)–5(B), when the pellets with the concave configuration 5 are placed on the laying surface 6 so that the concave surface faces upward, the concave configuration 5 acts as a dish for receiving the urine 8, and also serves to absorb fluid by each pellet of fluid absorbent coarse particulate matter 1.

As shown in FIGS. 4B and 5B, if only one of the upper or lower surfaces of each pellet is formed with a convex configuration 4 or a concave configuration 5, the probability that the configured surface will contact the laying surface 6 either downwardly or upwardly is one half.

If the upper and lower surfaces of each pellet formed with a convex configuration 4 or a concave configuration 5, as shown in FIGS. 4(A) and 5(A), the convex portions 4 of generally all pellets of the fluid absorbent coarse particulate matter 1 contact the laying surface 6. Similarly, the concave portions 5 of generally all pellets of the fluid absorbent coarse particulate matter 1 face upward with respect to the laying surface 6, and are defined as urine receiving dishes.

If both the upper and lower surfaces have the concave surface 5, the annular edge 9 of the downwardly facing concave surface 5 efficiently absorbs the urine overflowed from the upwardly facing concave surface 5. By compression molding the pellets of fluid absorbent coarse particulate matter 1 with the closed mold of FIGS. 6 and 7, a linear region having a rough compression density compared with other surfaces is formed on the annular edge 9 of the pellets. That is, the annular edge 9 is formed having a rough compression density and a favorable ability to absorb fluid.

[Re: Compression Molding Process]

In the first and the second embodiment, the absorbent material is confined within the closed mold shown, for example, in FIGS. 6 and 7, and compressed from all directions, so that each pellet has a prescribed configuration.

This shaping mold comprises a peripheral surface shaping portion 11 having circular or a polygonal shaping through-holes 10, and an upper surface shape pressing portion 13 having at least one pressing pin 12 which is pressed as a unit into the shaping through-holes 10 from above. The mold further comprises a lower surface shape pressure bearing portion 15 having at least one pressure bearing pin 14 which is inserted from under as a unit into the shaping through-holes 10. After a fluid absorbent material (including an absorbent material obtained by selectively blending the above-mentioned various additives) is filled into each of the shaping through-holes 10, the pressing pin 12 and the pressure bearing pin 14 are closed within each of the shaping through-holes 10. By doing so, the intended peripheral surface configuration and upper and lower configurations are provided.

Figure 6A:
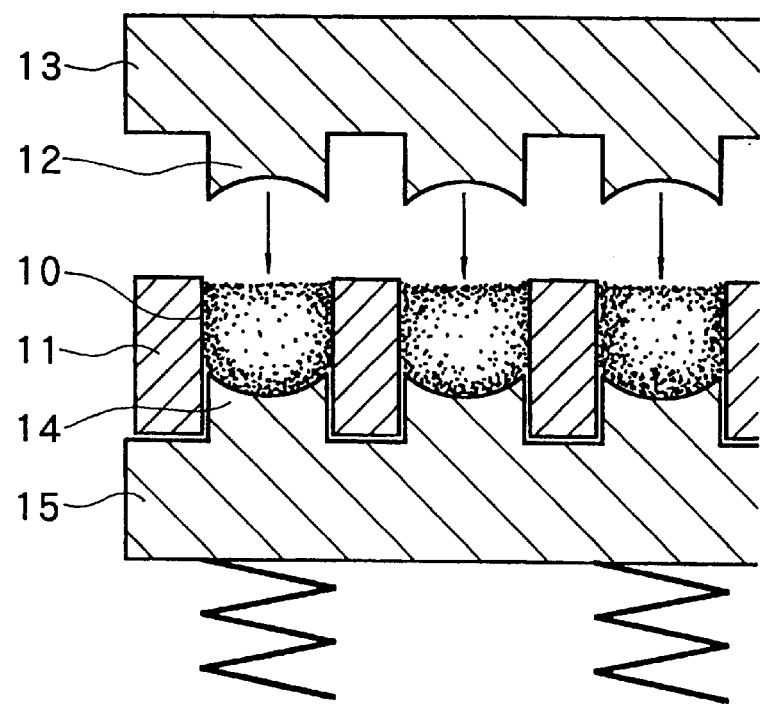
FIGS. 6(A)–6(B) are sectional views of a mold for providing a convex configuration to the pellets of fluid absorbent coarse matter of FIGS. 1(A)–1(B)

As shown in FIG. 6(A), if a convex configuration 5 is formed on the upper and lower surfaces of each pellet of fluid absorbent coarse particulate matter 1, the opposing end faces of the pressing pins 12 and the pressure bearing pins 14 have a concave configuration.

Figure 7A:
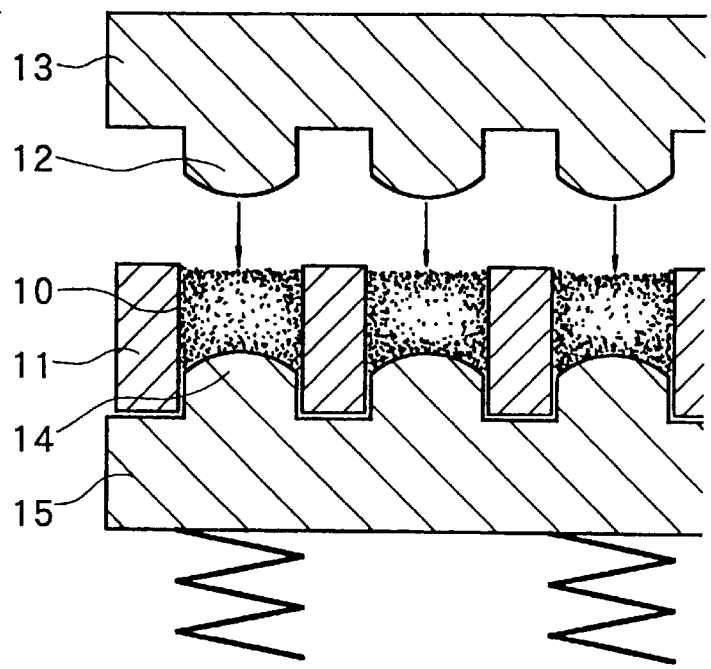
FIGS. 7(A)–7(B) are sectional views of a mold for providing a concave configuration to the pellets of fluid absorbent coarse matter of FIGS. 2(A)–2(B)

Also, as shown in FIG. 7(A), if the upper and lower surfaces of the pellets of fluid absorbent coarse particulate matter 1 have a concave configuration 4, the opposing end faces of the pressing pins 12 and the pressure bearing pins 14 have a convex surface.

Figure 6B:
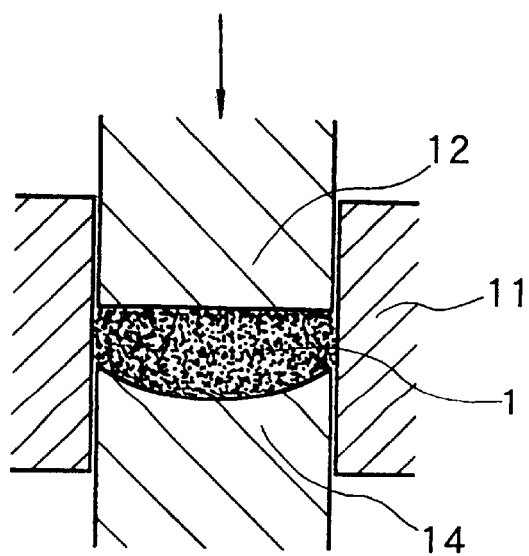
Figure 7B:
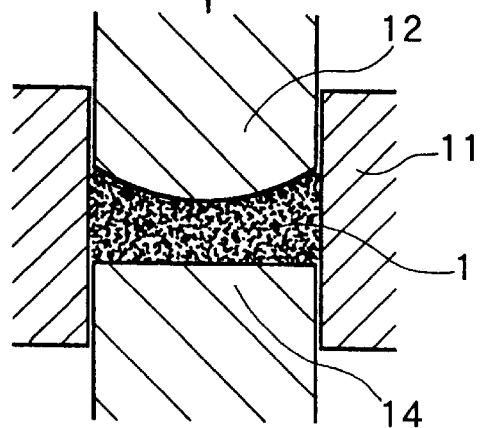

Further, as shown in FIGS. 6(B) and 7(B), if the configuration of just one of the upper or lower surfaces of the pellets of fluid absorbent coarse particulate matter 1 has a convex configuration 4 or a concave configuration 5, then the corresponding pin has a concave configuration if the former, or a convex configuration if the latter.

Figure 3A:
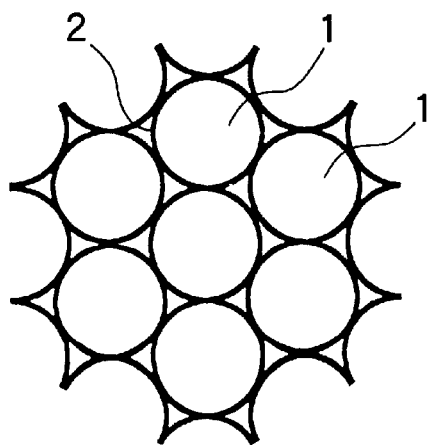
FIGS. 3(A)–3(B) are plan views showing a state in which the pellets of fluid absorbent coarse matter of FIGS. 1 and 2, having a circular or a polygonal peripheral surface configuration, are laid.
Figure 3B:
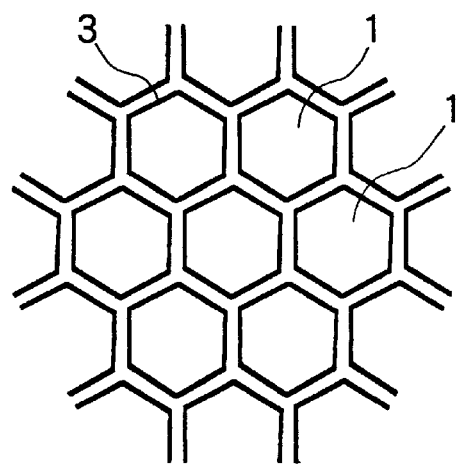

As shown in FIGS. 3(A)–3(B), the pellets of fluid absorbent coarse particulate matter 1 with the prescribed configuration are point-contacted through their peripheral surface configuration and uniformly laid. Likewise, they are side-contacted through their peripheral surface configuration and uniformly laid.

At the same time, the ability to capture the waste fluid with the convex configuration 4 or the concave configuration 5 is enhanced as described with reference to FIGS. 4 and 5. As a result, excessive permeation of the urine, etc. into the pellets of fluid absorbent coarse particulate matter 1 outside the area of discharged urine or other waste fluids is prevented.

Figure 8:
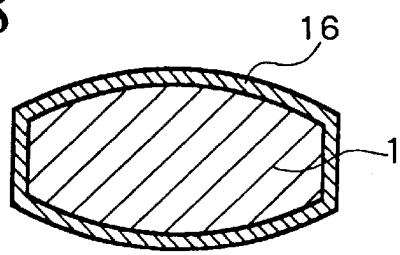
FIG. 8 is a sectional view showing the pellets of fluid absorbent coarse matter of FIGS. 1 and 2 covered with a cover-coat.

[Third Embodiment (see FIG. 8)]

In this third embodiment, the pellets of fluid absorbent coarse particulate matter 1, formed in accordance with the first and second embodiments, are blended with a water absorptive polymer so that a part of the water absorptive polymer forms a weak reaction layer 16 on the surface of each pellet.

If the pellets of fluid absorbent coarse particulate matter 1, which are blended with the water absorptive polymer, are impregnated with water by a shower, they can form the weak reaction layer 16, with which the water absorptive polymer is not fully reacted.

The weak reaction layer 16 functions as a cover coat or cover layer. The surface of each pellet of fluid absorbent coarse particulate matter I may also be covered with a cover layer composed of a substance other than a water absorptive polymer.

Suitable examples of a cover layer substance other than a water absorptive polymer include a starch layer, a polyvinyl alcohol layer, a polyethylene glycol layer, or a polypropylene glycol layer.

The selected substance is liquefied and then an appropriate quantity of such liquefied substance is sprayed on the surfaces of the pellets of fluid absorbent coarse particulate matter 1 in a shower fashion, so that it permeates into the surface layer portion of each pellet.

The cover layer including the weak reaction layer 16 comprising the water absorptive polymer, provides an antiweather property to the pellets. Therefore, aging changes can be prevented, the fluid retaining effects can be maintained for long time, and the effect of the additive blended with the fluid absorbent coarse particulate matter 1 can be maintained in a favorable manner. In addition, a configuration retaining character of the fluid absorbent coarse particulate matter 1 is provided, dust caused by friction among the pellets can be prevented, and the aggregating character among the particles may be exhibited when they contact the discharged waste fluid. In particular, in the first embodiment in which the water absorbent material is compression molded without the addition of water so as to have pellets of a prescribed configuration, the function can be enhanced by freely adding the additive which readily reacts with temperature and moisture, such as a water absorptive polymer, to the fluid absorbent coarse particulate matter 1. The cover coat can further enhance this function of the additive.

The present invention includes an embodiment in which the cover layer is applied while mixing the fluid absorbent coarse particulate matter 1 of the first through third embodiments with paper powder. This paper powder effectively exhibits the initial fluid absorbent character, in addition to having the ability to retain the configuration and to maintain the quality of products.

The pellets, which are formed by compression molding without adding water so as to have pellets of a predetermined configuration, rapidly absorb the discharged waste fluid. The matter is also excellent in disaggregation when it is discarded in the toilet.

Also, by providing a prescribed configuration of pellets, the quantity of the pellets of fluid absorbent coarse particulate matter to be laid can be made uniform. Therefore, inefficient consumption of the pellets can be effectively prevented, and a uniform liquid absorbing effect can be exhibited in the area for discharging the urine or other waste fluids.

Also, a discharged urine processing material function can be enhanced by freely adding an additive which readily reacts with moisture and temperature through the process of compression molding without adding water. In addition, by eliminating the need for water processing facilities and drying facilities, the production line can be assembled in a more cost-efficient and a function-efficient manner.

Also, by providing a convex configuration or a concave configuration to one or both of the upper and lower surfaces of each pellet of fluid absorbent coarse particulate matter, the fluid absorbing function can be enhanced by increasing the ability to retain waste fluid. Consequently, the waste fluid can effectively be prevented from excessively permeating adjacent pellets of fluid absorbent coarse particulate matter. Therefore, only the pellets in the area of discharged urine or other waste fluids must be removed and be replaced with fresh pellets. This effect is further enhanced by providing a prescribed configuration to pellets of fluid absorbent coarse particulate matter without the addition of water.

Also, by applying a cover coat or cover layer to the pellets of fluid absorbent coarse particulate matter, the ability to absorb fluid can be effectively maintained, and the fluid absorptive polymer can effectively act as an inner lining. In addition, the pellets satisfactorily retain their configuration. This characteristic is significant in the case where the fluid absorbent material with no water added is compression molded so as to have a prescribed configuration of pellets.

What is claimed is:

1. A waste fluid processing material comprising:
    pellets including fluid absorbent particles;
    each of said pellets having an upper surface, a lower surface, and a peripheral surface having a circular, tubular configuration, said peripheral surface separating said upper surface from said lower surface; and
    wherein both said upper surface and said lower surface have a convex shape such that, when said pellets are arranged so that said lower convex surface of each of said pellets contacts a laying surface, an annular void is formed between each of said pellets and the laying surface.

2. The processing material of claim 1, wherein said pellets further include a water absorbent polymer.

3. The processing material of claim 2, wherein said water absorbent polymer forms a reaction layer on each of said surfaces of each of said pellets.

4. The processing material of claim 2, wherein said pellets further include a cover layer on each of said surfaces of each of said pellets.

5. The processing material of claim 1, wherein said pellets further include a cover layer on each of said surfaces of each of said pellets.

6. A waste fluid processing material comprising:
    pellets including fluid absorbent particles;
    each of said pellets having an upper surface, a lower surface, and a peripheral surface separating said upper surface from said lower surface; and
    wherein both said upper surface and said lower surface have a concave shape.

7. The processing material of claim 6, wherein said peripheral surface has a circular configuration.

8. The processing material of claim 6, wherein said peripheral surface has a polygonal configuration.

9. The processing material of claim 6, wherein said pellets further include a water absorbent polymer.

10. The processing material of claim 9, wherein said water absorbent polymer forms a reaction layer on each of said surfaces of each of said pellets.

11. The processing material of claim 9, wherein said pellets further include a cover layer on each of said surfaces of each of said pellets.

12. The processing material of claim 6, wherein said pellets further include a cover layer on each of said surfaces of each of said pellets.

13. A waste fluid processing material comprising:

pellets including fluid absorbent particles;

each of said pellets having an upper surface, a lower surface, and a peripheral surface having a polygonal configuration, said peripheral surface separating said upper surface from said lower surface; and wherein both said upper surface and said lower surface have a convex shape such that, when said pellets are arranged so that said lower convex surface of each of said pellets contacts a laying surface, an annular void is formed between each of said pellets and the laying surface.

14. The processing material of claim 13, wherein said pellets further include a water absorbent polymer.

15. The processing material of claim 14, wherein said water absorbent polymer forms a reaction layer on each of said surfaces of each of said pellets.

16. The processing material of claim 14, wherein said pellets further include a cover layer on each of said surfaces of each of said pellets.

17. The processing material of claim 13, wherein said pellets further include a cover layer on each of said surfaces of each of said pellets.

18. A waste fluid processing material comprising:

pellets including fluid absorbent particles and a water absorbent polymer;

each of said pellets having an upper surface, a lower surface, and a peripheral, tubular surface separating said upper surface from said lower surface, wherein said water absorbent polymer forms a reaction layer on each of said surfaces of each of said pellets; and wherein said lower surface has a convex shape such that, when said pellets are arranged so that said lower convex surface of each of said pellets contacts a laying surface, an annular void is formed between each of said pellets and the laying surface.

19. The processing material of claim 18, wherein both said upper surface and said lower surface have a convex shape.

20. The processing material of claim 19, wherein said peripheral, tubular surface has a circular configuration.

21. The processing material of claim 19, wherein said peripheral, tubular surface has a polygonal configuration.

22. The processing material of claim 18, wherein said peripheral, tubular surface has a circular configuration.

23. The processing material of claim 18, wherein said peripheral, tubular surface has a polygonal configuration.

24. The processing material of claim 18, wherein said pellets further include a cover layer on each of said surfaces of each of said pellets.

25. A waste fluid processing material comprising:

pellets including fluid absorbent particles and a water absorbent polymer;

each of said pellets having an upper surface, a lower surface, and a peripheral surface separating said upper surface from said lower surface, wherein said water absorbent polymer forms a reaction layer on each of said surfaces of each of said pellets; and wherein at least one of said upper and said lower surfaces has a concave shape.

26. The processing material of claim 25, wherein both said upper surface and said lower surface have a concave shape.

27. The processing material of claim 26, wherein said peripheral surface has a circular, tubular configuration.

28. The processing material of claim 26, wherein said peripheral surface has a polygonal configuration.

29. The processing material of claim 25, wherein said peripheral surface has a circular, tubular configuration.

30. The processing material of claim 25, wherein said peripheral surface has a polygonal configuration.

31. The processing material of claim 25, wherein said pellets further include a cover layer on each of said surfaces of each of said pellets.

* * * * *